(No Model.)   2 Sheets—Sheet 1.

S. N. KNIGHT.
GATE AND NOZZLE FOR WATER WHEELS.

No. 267,087.   Patented Nov. 7, 1882.

Witnesses
Geo. H. Strong.
Frank A. Brooks

Inventor
Samuel N. Knight,
By Dewey & Co.
Attys (No Model.) 2 Sheets—Sheet 2.

S. N. KNIGHT.
GATE AND NOZZLE FOR WATER WHEELS.

No. 267,087. Patented Nov. 7, 1882.

Witnesses
Geo. H. Strong.
Frank A. Brooks.

Inventor
Samuel N. Knight
By Dewey & Co.
Attys

UNITED STATES PATENT OFFICE.

SAMUEL N. KNIGHT, OF SUTTER CREEK, CALIFORNIA.

GATE AND NOZZLE FOR WATER-WHEELS.

SPECIFICATION forming part of Letters Patent No. 267,087, dated November 7, 1882.

Application filed February 25, 1882. (No model.)

*To all whom it may concern:*

Be it known that I, SAMUEL N. KNIGHT, of Sutter Creek, Amador county, State of California, have invented a Gate and Nozzle for Water-Wheels and Means for Operating the Same; and I hereby declare the following to be a full, clear, and exact description thereof.

My invention relates to a nozzle and an adjustable regulating-gate for the admission and direction of water to water-wheels, and to a means for operating the gate so that a greater or less amount of water may be supplied, according to the work to be accomplished.

Figure 1:
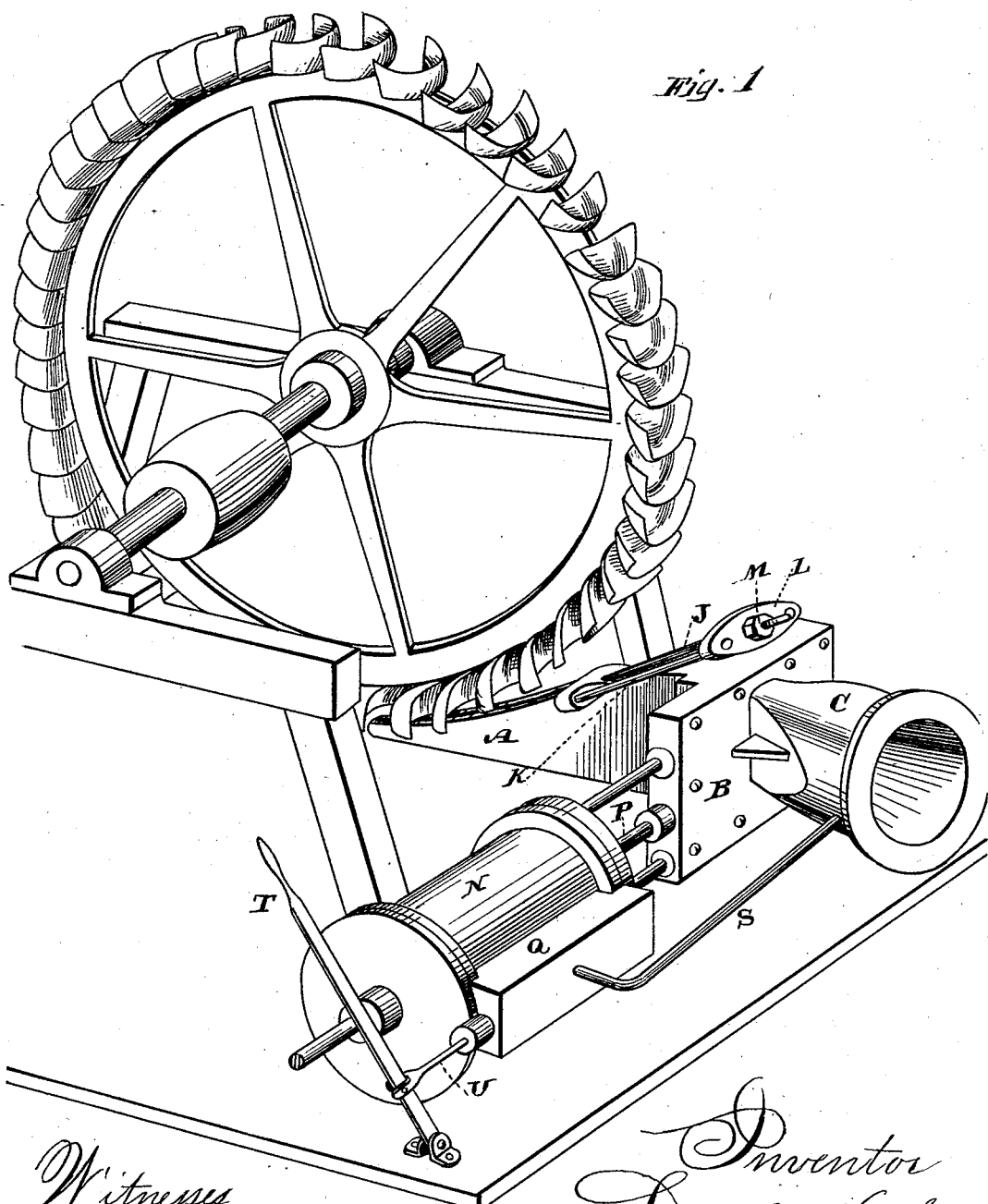
Figure 2:
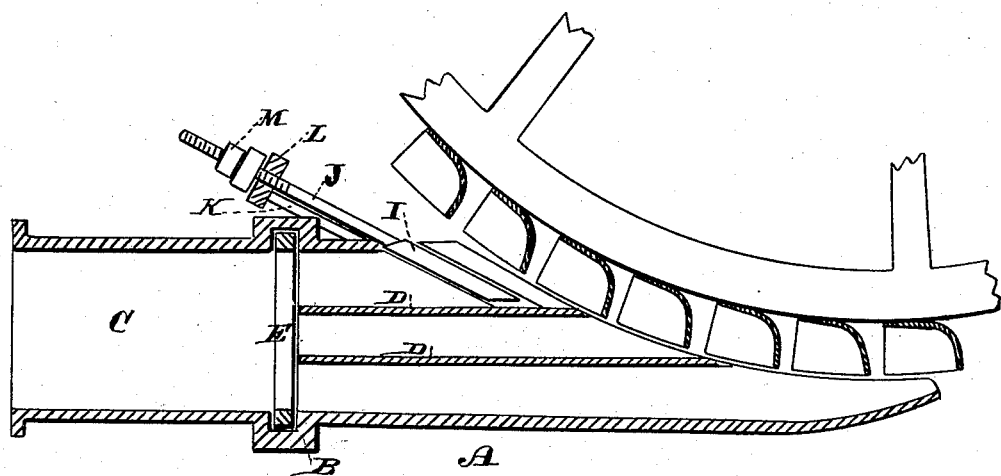
Figure 3:
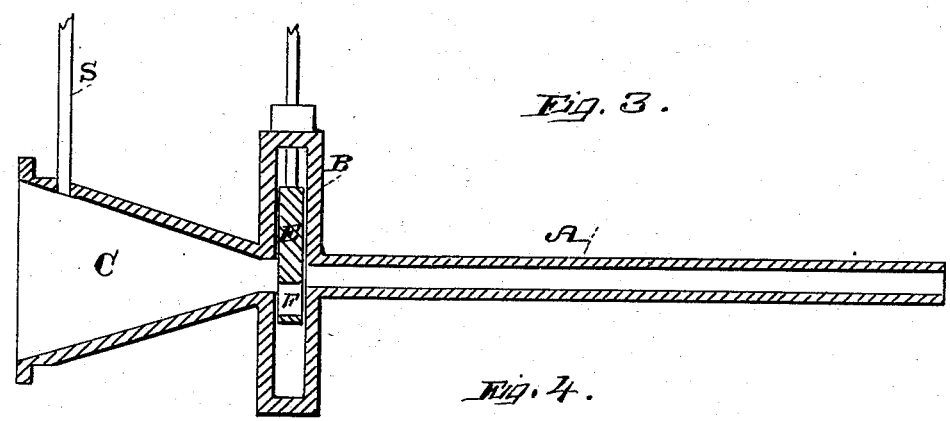
Figure 4:
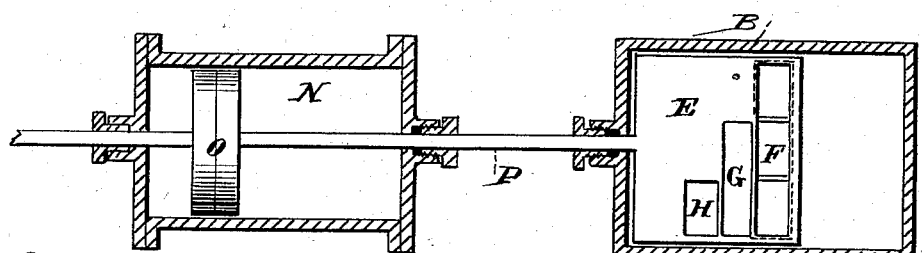
Figure 5:
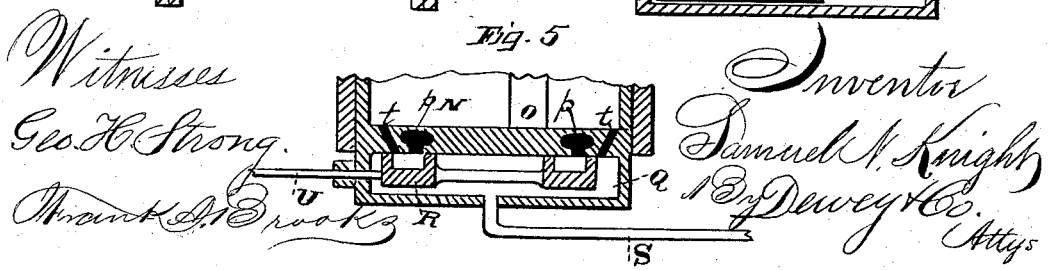

Referring to the accompanying drawings for a more complete explanation of my invention, Figure 1 is a general view of my apparatus as applied to a wheel. Fig. 2, Sheet 2, is a vertical section, showing the independent water-passages in the nozzle and gate. Fig. 3 is a horizontal section of nozzle and gate. Fig. 4 is a vertical section of gate-chamber, showing gate in elevation, also operating-cylinders. Fig. 5 is a view of valve-chamber.

My invention is shown in the present case as applied to that class of wheels which are driven by the momentum of a stream of water which is delivered against the buckets from a nozzle under a high pressure, these wheels being known as "hurdy-gurdy" wheels, and the invention enables me to regulate the supply of water to the power required with great minuteness, and to provide a device by which the gate may be easily opened or closed, whatever may be the pressure.

A is the nozzle, B is the chamber within which the gate moves across the rear end of the nozzle to open or close it, and C is the pipe through which water is brought to the nozzle.

The nozzle A is narrow, but of considerable depth, and the discharge end is curved to the shape of the wheel, its concavity closely following the rim of the wheel or buckets, as shown. This nozzle is divided longitudinally by partitions D, which extend from the gate-chamber to the front, so that when the nozzle is full of water the latter will be divided into three or more separate streams.

The gate E has a height equal to the entire depth of the nozzle, and fits closely enough in its diameter to cut off the supply of water from the nozzle when closed. This gate moves transversely across the pipe or nozzle, and is something more than four times the width of the nozzle-opening. At one side of the gate is formed a slot, F, which is the full size of the nozzle, so that when it stands opposite the nozzle all three of the passages between the partitions D are exposed to receive a full head of water from the conveying-pipe. By the side of the opening F is another opening, G, which extends two-thirds the depth of the nozzle, and when brought opposite to the nozzle will admit water to the two lower compartments only, leaving the upper one closed. The opening H in the gate is of a height equal to the lower compartment only, and when it is brought opposite the nozzle only this compartment will be supplied with water.

More or less compartments may be made through the nozzle, if it is desired to graduate the amount of water discharged upon the wheel, and therefore the amount of power, more closely. By this construction two or more of the compartments may be opened to carry water.

If it is necessary to regulate the amount more closely, I employ an independent gate, I, which moves up and down in the upper compartment of the nozzle, so as to open or close it without reference to the main gate E. The stem J of this gate extends upward and backward, as shown, and its upper part has screw-threads cut upon it.

A stationary plate, L, supported on the upper ends of rods, K, is perforated at its center, and through the perforation passes a rod, J, attached to gate E, and having its upper end threaded, and on this threaded end works a nut, M, the turning of which retracts rod J, raising gate E, or allows it to descend with said gate, as desired. The stem of the valve passes through this nut, and by turning the latter the valve is set at any desired point. A rack and pinion or other suitable mechanical equivalent might be employed in place of the screw. When this secondary gate is to be used the valve E, is opened to its full width, and the gate I is then set to admit as much water through the upper compartment as may be desired.

In order to move the valve E easily under the great pressure to which it is subjected, I employ a pressure-cylinder, N, having a piston, O, moving within it. This cylinder is set horizontally, and is in the line of motion of the gate E, and the piston-rod P is fixed to the gate and to the piston, so that the movement of the latter will open or close the gate more or less, as desired. The cylinder has a valve-chamber, Q, and any suitable form of valve, R, to admit water, and said valve-chamber is provided with ingress-ports $t\ t$ and exhaust-ports $p\ p$. The power is supplied by water from the main pipe C through a branch pipe, S, which leads from it into the valve-chamber of the cylinder.

A suitable lever, T, is connected with the valve-stem U, and by moving the valve in either direction water is admitted into the cylinder, and by its pressure upon the piston opens or closes the gate E. A suitable indicator shows the exact position of the gate.

Having thus described my invention, what I claim as new, and desire to secure by Letters Patent, is—

1. In a nozzle consisting of independent passages for the discharge of water under pressure upon a wheel rotating in a vertical plane, the gate having ports by which one, two, or more of the passages may be opened or closed, in combination with a piston moving within a cylinder and connected with the gate by its piston-rod, so that a pressure of water admitted to either side of the piston will move the gate across the water-passages, substantially as herein described.

2. The nozzle A for the discharge of water in independent parallel streams upon the periphery of a vertically-rotating wheel, as shown, in combination with the transversely-moving gate E, having many ports, the cylinder N, piston O, and rod P, valve R, and the pipe S, leading from the main supply-pipe to the valve-chamber, substantially as and for the purpose herein described.

3. The nozzle A, having independent parallel ports, and gate E, as shown, in combination with the independent gate I, and stem, whereby the opening of the upper port may be regulated, substantially as herein shown.

4. In combination with a wheel rotating in a vertical plane and having buckets arranged around its periphery, the independent parallel water-passages placed one above the other in the plane of rotation and exterior to the wheel, and the gate E, sliding transversely across the passages, and having openings F G H of different heights, substantially as described.

5. In combination with a wheel rotating in a vertical plane and having peripheral buckets into which water under pressure may be discharged through a nozzle consisting of two or more independent parallel passages or chambers, as shown, the main gate E, having ports of different sizes, the piston N, moving in a cylinder and connected with the gate by its piston-rod, and the supplemental gate I, with its independent actuating-stem, substantially as herein described.

In witness whereof I hereunto set my hand.

SAMUEL N. KNIGHT.

Witnesses:
CHARLES H. NORTON,
CHARLEY GORMAN.